G. G. CRANE.
FLUID CLUTCH.
APPLICATION FILED DEC. 14, 1911.
1,030,463.
Patented June 25, 1912.
2 SHEETS—SHEET 1.
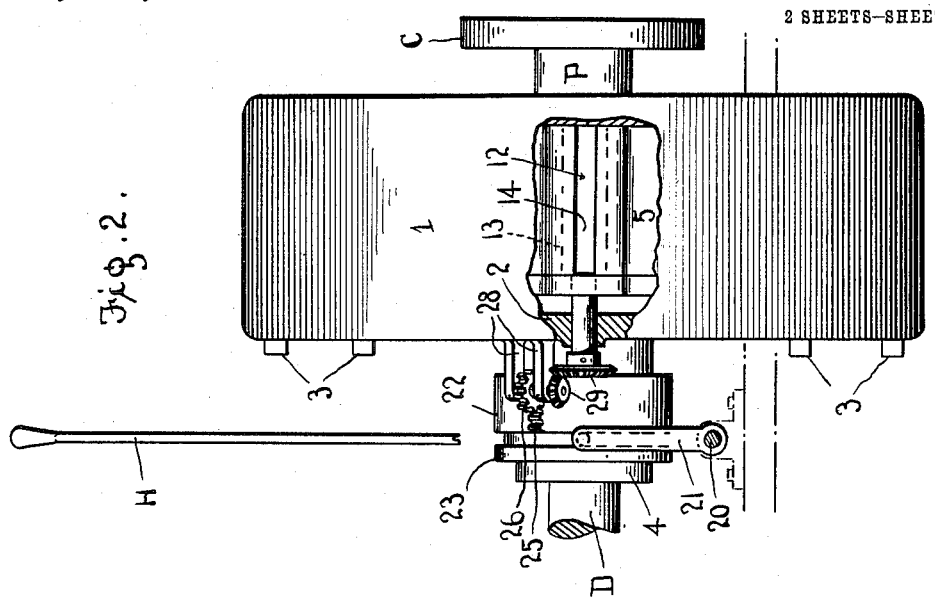
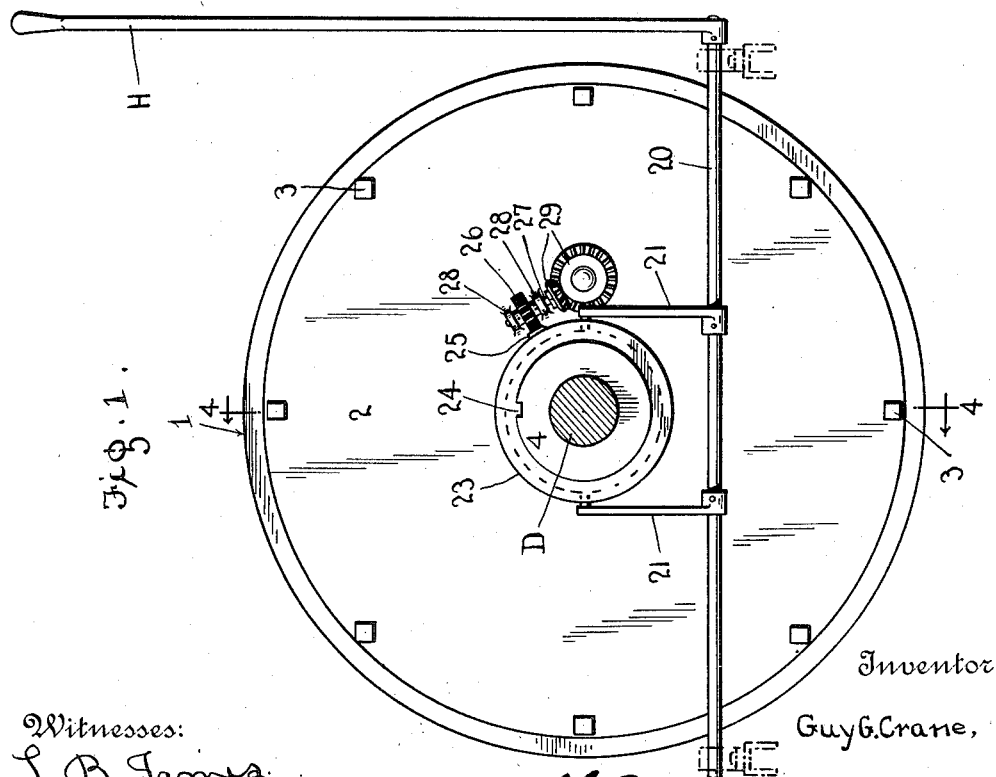
Witnesses:
L. B. James
N. L. Collamer
Inventor:
Guy G. Crane,
by H. R. Wilson & Co.,
Attorneys.

G. G. CRANE.
FLUID CLUTCH.
APPLICATION FILED DEC. 14, 1911.
1,030,463.
Patented June 25, 1912.
2 SHEETS—SHEET 2.
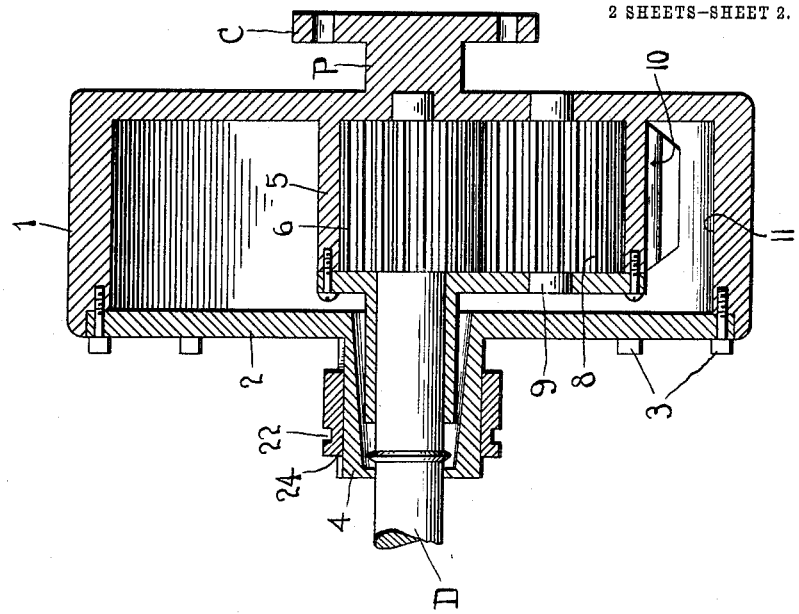
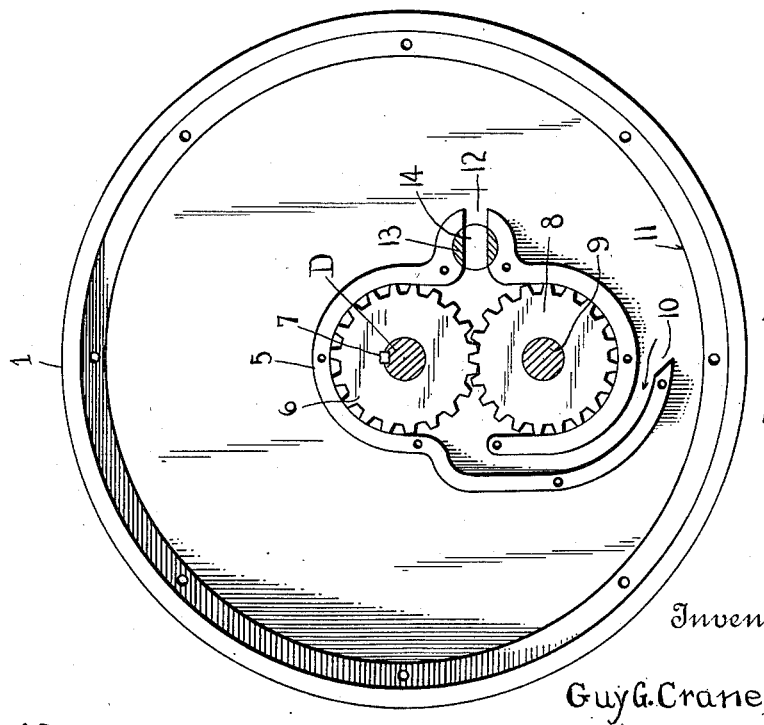
Witnesses:
L. B. James.
N. C. Clamer.
Inventor:
Guy G. Crane,
by H. B. Willson & Co.,
Attorneys.

UNITED STATES PATENT OFFICE.

GUY G. CRANE, OF ROCKFORD, ILLINOIS.

FLUID-CLUTCH.

1,030,463.          Specification of Letters Patent.    Patented June 25, 1912.

Application filed December 14, 1911. Serial No. 665,635.

*To all whom it may concern:*

Be it known that I, GUY G. CRANE, a citizen of the United States, residing at Rockford, in the county of Winnebago and State of Illinois, have invented certain new and useful Improvements in Automobile Fluid-Clutches; and I do declare the following to be a full, clear, and exact description of the invention, such as will enable others skilled in the art to which it appertains to make and use the same.

This invention relates to clutches and more especially to those employing fluid; and the object of the same is to greatly simplify the mechanism of a device of this character and avoid the shifting of gears when a change of speed between the power and driven shafts is desired.

A further and important object of the present invention is to dispose the inlet to the gear pump quite near the inner wall of the drum containing the mechanism and with its mouth in such direction that as the drum rotates forwardly the mouth will take up the fluid within the drum which is usually oil and often quite thick.

These objects are accomplished by the construction hereinafter more fully described and claimed, and as shown in the drawings wherein—

Figure 1 is an end elevation of this improved clutch, and Fig. 2 an edge view thereof with part of the rim broken away. Fig. 3 is an end view with the nearer face plate removed, and Fig. 4 is a section on the line 4—4 of Fig. 1.

The drawings illustrate only so much of an automobile driving mechanism as is necessary for an understanding of this invention, the letter P designating the power shaft which may be the crank shaft of the gasolene engine or may be connected thereto by any suitable means such as the coupling C, the letter D designating the driven shaft in which between the transmission and the driving axle a clutch is usually included, and the letter H designating a handle or lever for moving the shifting mechanism forming part of this invention.

In the embodiment of the invention shown on the accompanying drawings, the numeral 1 designates a drum secured in any suitable manner to the power shaft P or rotated thereby, and preferably having one face plate 2 removable as by screws 3 and formed with a hub 4 through which the driven shaft D projects to the interior of the drum. Therein said shaft passes through and is journaled in the casing 5 of a gear pump of any suitable type, herein shown as comprising one gear 6 fastened as at 7 upon said shaft D or an extension thereof and a second gear 8 whose stub shafts 9 are journaled within the casing 5 and whose teeth intermesh with those of the first. The casing 5 is provided with an inlet 10 disposed quite near the inner face of the wall 11 of the drum, and opening in a proper direction to take up the fluid when the drum revolves as indicated by the arrow. Such fluid is preferably oil and often quite thick, and will be densest near the inner wall of the drum by reason of centrifugal force; and the disposition of the mouth of the inlet as shown in Fig. 3 is therefore of advantage. The casing 5 is also provided with an outlet 12 preferably disposed nearer the axis of the drum and adjacent the point where the teeth of the gears intermesh. This outlet is formed with a valve, the type thereof illustrated in the drawings including a plug 13 with a transverse opening 14 through it.

An important feature of this invention lies in the means for controlling the transmission mechanism above described. As shown in the drawings this consists of the following instrumentalities. The lever H is connected in some suitable way with a rock shaft 20, and the latter carries a yoke 21 loosely engaging a groove 22 in a collar 23 which is slidably mounted or keyed as at 24 on the hub 4 of the drum D. Externally this collar is provided with teeth 25 transverse to its axis and therefore constituting a rack, and engaging said teeth is a toothed pinion 26 fast on a shaft 27 mounted in bearings 28 on the drum D, which shaft is connected in any suitable way as by bevel gears 29 with the plug 13 forming part of the outlet valve in the gear pump.

The operation of this device will now be clear. The drum is entirely filled with oil so that the parts are bathed in a lubricant and run smoothly and noiselessly. When the lever H is thrown to one extremity the opening 14 in the plug 13 alines with the outlet 12 in the gear case 5, so that the passage of oil into the inlet, through the teeth of the gears and out of the outlet is unimpeded; and if the parts be properly proportioned the power shaft P may then rotate the drum quite rapidly without imparting any motion to the driven shaft D. By preference the drum revolves in the direction indicated by the arrow so that the oil passes freely into the inlet 10 which is slightly enlarged so as to receive it, the oil near the wall 11 of the drum being a little denser than at its center, because it is thrown outward by centrifugal force. If now the lever or handle H is moved, the yoke slides the collar along the hub of the drum and the train of gears between the collar and the plug 13 turns the latter slightly so that the outlet 12 is to an extent restricted; this impedes the passage of oil therethrough to a degree depending upon the amount of rotation imparted to the plug 13, and thereafter the rotation of the power shaft P will be communicated to a certain degree to the driven shaft D. When the lever or handle H is thrown to the other extreme of its position, the parts are intended to be so proportioned that the opening 14 in the plug 13 will stand at right angles to the outlet 12 and the passage of oil or other fluid out of the gear pump will be entirely checked; and thereafter the rotation of the power shaft P will cause the driven shaft D to rotate in unison with it. Meanwhile, in order to effect the changes described, it will be seen that no gears have been shifted and there has been no noise or danger of breakage. On high speed the gears stand at rest relative to each other and rotate bodily with the casing, and when the shafts are entirely disconnected from each other the idle gear 8 is revolving around the other gear and the drum is rotating while the driven shaft is stationary. It is obvious, however, that the parts could be reversed so that the shaft D becomes the power and the shaft P the driven element. It will also be obvious that changes in details of construction might be adopted without departing from the principle of my invention. While this invention has been described in connection with the transmission mechanism of an automobile or a gasolene engine, it is obvious that it can be employed in other places and for other uses as well.

What is claimed as new is:

In a fluid clutch, the combination with the driving and driven shafts, and a drum connected with one of them and having a hub through which the other projects; of a gear pump whose casing is secured within the drum with its inlet adjacent the wall thereof and one of its gears connected with said last-named shaft, a valve in its outlet whose plug is extended to the exterior of the drum, a collar splined on the hub of the latter, a rack on the exterior of the collar, a toothed pinion meshing therewith, a shaft journaled in bearings across the exterior of the drum and carrying said pinion, and gear wheels connecting said shaft with the extended end of the plug for turning the latter more or less.

In testimony whereof I have hereunto set my hand in presence of two subscribing witnesses.

GUY G. CRANE.

Witnesses:
 GEORGE H. SMITH,
 RALPH E. GUYTON.